(12) United States Patent
Landry

(10) Patent No.: US 9,818,128 B2
(45) Date of Patent: Nov. 14, 2017

(54) ENCOURAGING CONTENT DISTRIBUTION WITHOUT RESTRICTIONS

(75) Inventor: Robin J. Landry, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 2041 days.

(21) Appl. No.: 12/131,022

(22) Filed: May 30, 2008

(65) Prior Publication Data

US 2009/0299858 A1 Dec. 3, 2009

(51) Int. Cl.
| | |
|---|---|
| *G06Q 30/02* | (2012.01) |
| *G06Q 10/06* | (2012.01) |
| *G06Q 20/12* | (2012.01) |
| *G06Q 20/14* | (2012.01) |
| *G06Q 30/06* | (2012.01) |

(52) U.S. Cl.
CPC ......... *G06Q 30/0241* (2013.01); *G06Q 10/06* (2013.01); *G06Q 20/123* (2013.01); *G06Q 20/145* (2013.01); *G06Q 30/02* (2013.01); *G06Q 30/0273* (2013.01); *G06Q 30/0283* (2013.01); *G06Q 30/06* (2013.01); *G06Q 30/0601* (2013.01)

(58) Field of Classification Search
USPC ........................................................ 705/14.4
See application file for complete search history.

(56) References Cited

U.S. PATENT DOCUMENTS

| | | | | |
|---|---|---|---|---|
| 6,248,946 | B1* | 6/2001 | Dwek | G06F 17/30749 434/307 A |
| 2002/0112171 | A1* | 8/2002 | Ginter | G06F 21/10 713/185 |
| 2006/0287920 | A1* | 12/2006 | Perkins | G06Q 30/0251 705/14.49 |
| 2007/0283268 | A1* | 12/2007 | Berger | G06F 17/30817 715/716 |
| 2008/0109300 | A1* | 5/2008 | Bason | G06Q 30/0277 705/14.73 |
| 2008/0189167 | A1* | 8/2008 | Antonov | G06Q 30/02 705/14.64 |
| 2008/0195460 | A1 | 8/2008 | Varghese | |
| 2008/0249841 | A1* | 10/2008 | Ruark | G06Q 30/02 705/7.29 |
| 2009/0299858 | A1* | 12/2009 | Landry | G06Q 10/06 705/14.69 |

* cited by examiner

*Primary Examiner* — Tsan-Yu J Huang
(74) *Attorney, Agent, or Firm* — Lowenstein Sandler LLP

(57) ABSTRACT

An embodiment relates generally to a method of monitoring playback of content. The method includes providing for a file of content and embedding a playback counter in the file of content, the playback counter associated with a vendor. The method also includes distributing the file of content with the playback counter without restriction and incrementing a value of the playback counter in response to a viewing of the file of content with the embedded playback counter. The method further includes forwarding the value to the vendor to determine a payment to an author of the content.

13 Claims, 8 Drawing Sheets

ENCOURAGING CONTENT DISTRIBUTION WITHOUT RESTRICTIONS

FIELD

This invention relates generally to content distributions systems, more particularly to systems and methods for a playback counter in content distribution.

DESCRIPTION OF RELATED ART

The World Wide Web is emerging as a preferred method of distributing media content (such as audio files, image files, or video files). Services or sites like ITUNES and YOUTUBE.COM are highly popular. Since a high number of users visit sites like YOUTUBE.COM, LULU.TV, RHAPSODY.COM, others, content providers would like to capitalize on the high traffic volume, and develop interesting content to be monetized when viewed by the users. Existing revenue models depend on various mechanisms such as custom agreements between sites and vendors, collection societies such as those found in radio or Internet radio, ad-hoc pooling of content with revenue sharing based on weekly popularity ratings, or other mechanisms. Vendors of products and/or services would also like to capitalize the high traffic volume to increase exposure and sales of their respective products and/or services.

Currently, there are arrangements where vendors can provide a selection products and/or advertisements to the content providers to be placed in the created content. A content provider can select a number of products to be placed within their content. The vendor can then pay the content provider a set pre-arranged fee for the selected products and/or advertisements.

This system has drawbacks and disadvantages. For example, if the content is highly popular, i.e., "becomes viral", the vendor is pleased because of the high number of users viewing the content. However, the content provider may feel disappointed of not negotiating a higher fee for the placed products and/or advertisement. Moreover, the use of product placement comes at a creative cost because of the obligation to use the placed products in return for money. The converse is true where if the content is unpopular. The vendor may be disappointed of the lack of users and the content provider may be content with meeting or exceeding cost of producing the content based on the received fee for the placed products and/or advertisements. Accordingly, there is a need for a mechanism for a payment model that equitably distributes income based on the popularity of the content.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 3A illustrates another exemplary user interface in accordance with various embodiments;

Figure 1:
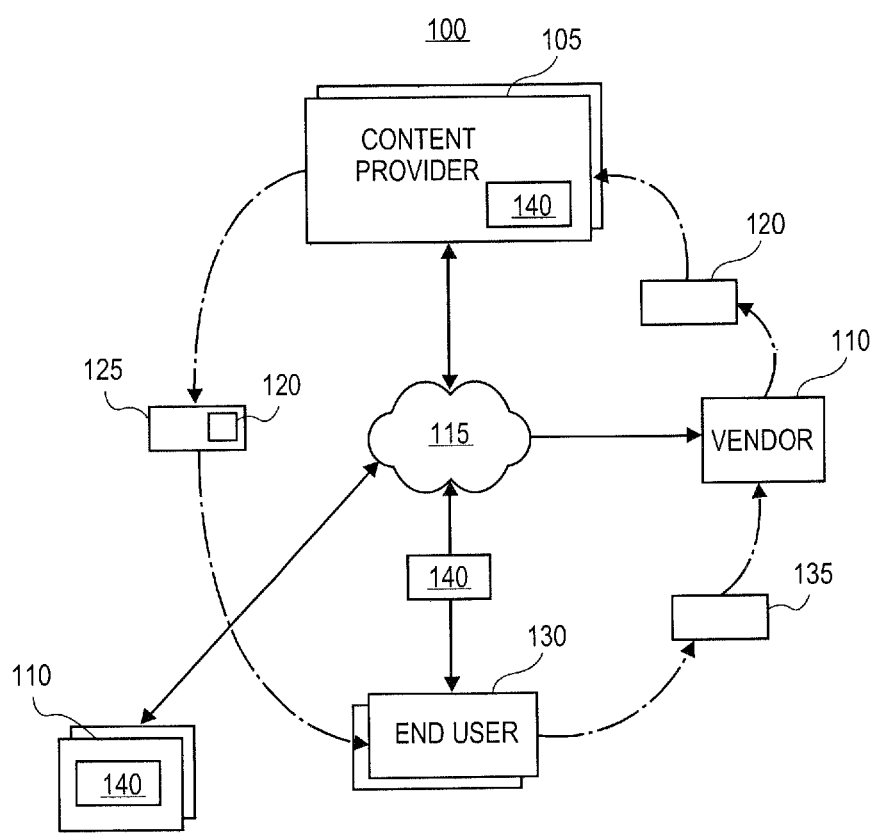
FIG. 1 depicts an exemplary system in accordance with various embodiments.

It will be appreciated that for simplicity and clarity of illustration, elements shown in the drawings have not necessarily been drawn to scale. For example, the dimensions of some of the elements are exaggerated relative to each other. Further, where considered appropriate, reference numbers have been repeated among the drawings to indicate corresponding elements and a repetitive explanation thereof will be omitted.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types digital content distribution systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for encouraging the distribution of content or media without restrictions. More particularly, instead of applying bulky and inconvenient digital rights management techniques to control the unauthorized proliferation of the content, the tracking and payment system described herein encourage the distribution of content with payment in proportion to the popularity of the content. Hence, a content author can be fairly compensated for his or her work.

A content author or provider can visit a third-party vendor (or broker) web site to select the product(s) and/or advertisement(s) (hereinafter "product(s)") to be incorporated in the content of the content provider. The content author may have to exercise some judgment regarding which elements of content they wish to particularly specify, and those elements such products shown in background scenes for which they can accept substitutions. For example, a content provider may accept the placement of any number of brands of food products in a kitchen scene of a movie, but insist that a sidewalk scene be generated displaying a specific name or brand for a background restaurant or other establishment. Subsequently, the content provider can develop the content with the placed product(s) and place the developed content for distribution such as an FTP site, third party distribution or services sites (e.g., YOUTUBE.COM, ITUNES, LULUTV.COM, RHAPSODY.COM etc.), cellular telephone websites, portable media players, compact disc ("CD"), digital video disc ("DVD") or other electronic/permanent media or channels.

In accordance with several embodiments, the content provider, vendor or other participant can track the playback of the distributed content in a variety of methods. In embodiments, a playback counter can be used to track and record the number of playbacks of a piece of content. In embodiments, the playback counter can be built into the media player used to present the content, or can be built into the content itself. The playback counter can be configured to "call home" to an associated server or be retrieved/reset based on a defined external event. That event can include a return visit to the distributor site and/or an incident where a tool reads the playback counter, but in any case a vendor, author, broker, distributor or other entity maintains a playback tally for eventual pay out. A unique ID can be used (player, time, platform, original host of content, etc.) to add confidence to the playback tally for instance by marking plays, players, or a copy of content as unique or not. The unique or global ID can identify different entities, including a media player user to play the content, time of day or date information, a client or other platform, a user account number, the original host of the content being played, or other entities in the distribution chain. The unique or global ID can in embodiments be recorded in or be made part of either or both an internal playback counter or an external counter. In embodiments the unique ID information can be recorded as part of the pay out tally, depending on the terms. A playback time-stamp can also be used in combination with any combination of the above, and stored in the internal or external or tally counters. The recording of time-stamp data can again be made to depend on the governing terms, and can be used to confirm that the specific section of the content with the vendor's product/service placement was indeed played. In terms of format, in embodiments the time-stamp data can be stored as specific timestamps or as service counters, or in other schema. For example, a time-stamp can be used to record that at the 1:30 mark within a certain video file, a "+1" was incremented to a "Dog Chow" product backdrop, or the time-stamp data can be used to record vs. a time/day/month/year starttime-endtime for which the inserted clip or other content was played. In embodiments, the governing terms can restrict or allow the player/content to be accessed for retrieval later, to permit a callback upon playback for counting, or to not be counted or recorded again, depending on the stipulations. Each system has varying degrees of accuracy, overhead, requirements and could be deployed either together or not. For example, a platform can be configured to keep an internal count if a distributor site can't be reached but is set for retrieval later, but if transmission is possible proceed to send the data over and reset the playback counter to 0. According to embodiments, an identification of the media (being) played can be required, which can be described as a unique of global ID. The global ID can be an additional piece of data, or in embodiments the counter can be assigned as the unique identifier.

According to embodiments, it is possible to house several counters in a piece of content, at a vendor, or other locations. When multiple counters are used, instead of tracking one counter, separate counters could be utilized in or for a single piece of content for different purposes, including for purposes of tracking which product among multiple inserted products was actually played, and thus should be counted.

Users can be encouraged to freely distribute the content without any repercussions. If the content is truly popular or unpopular, the playback counter or tally counter can verify the popularity by the number of playbacks.

Accordingly, the third-party vendor can pay the content provider based on the number of viewing of the content over a period of time as opposed to paying an upfront fee. The third-party vendor has concrete feedback on the number of viewers on the placed product and/or advertisement. This way, third-party vendors will not be obligated to pay a content creator a large sum of money for a placed product that may not be effective with viewers and content creators will receive a proportional amount of money for the placed/advertisements in the popular content. In embodiments, content creators who demonstrate a record of generating popular content can be rewarded with more favorable payment terms.

FIG. 1 illustrates an exemplary system 100 in accordance with various embodiments. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a content provider 105, a vendor 110, and the Internet 115. The content provider 105 can be a person, business entity or public entity engaged in producing content. The content can be any form of media such as a digital image, an audio file, a video file, online text, etc.

The vendor 110 can be a public or private entity engaged in selling products and services. Vendor 110 can also sell advertisements for the respective products/services. The vendor 110, in some embodiments, can be a service, i.e., a broker, that contracts with original vendors to represent their respective products and/or services.

The vendor 110 can also provide a product placement service. More particularly, a vendor 110 can provide a website that displays the products, services or advertisements available for placement in content. The vendor website can also display the payment rate for each product, service or advertisement. As a result, a content provider 105 can select any number of products/services or advertisements to be placed in their generated content. The details of implementing a vendor website with these specifications described above and in greater detail below are known to those skilled in the art.

In some embodiments, the vendor website can generate a playback counter 120 and associated with the selection of products. The playback counter 120 can be assigned a global identifier. The content provider 105 can then download the playback counter 120 to be embedded into the generated content 125. Subsequently, the content provider 105 can distribute the content 125 with the playback counter 120 in distribution channels for viewing by users 130 over the Internet 115.

As the content 125 is distributed and played, the playback counter 120 can increment and transmits its current value 135 to a designated destination, along with the global identifier and optionally a player identifier number which is generated based on time, a host computing platform or other unique factor. The optional player identifier can be stored with the playback counter 120. More specifically, the playback counter 120 can be configured to transmit to a payment module 140 hosted by the content provider 105, the vendor 110 or a third party website contracted to track distributed playback counters.

The payment module 140 can be configured to receive the current value 135, global identifier and the player identifier (when present) from the playback counter 120. Depending on the fee arrangement, the payment module can accumulate the total number of plays of the content 125 based on unique plays, i.e., one play per each host computer device, a total number of plays or combinations thereof. Accordingly, the vendor 110 can provide a fixed fee for each time the content is played via a playback counter 120 transmitting the current counter value 135 of the playback along with an identifier of the host computer device back to the vendor 110 through the Internet 115.

Figure 1A:
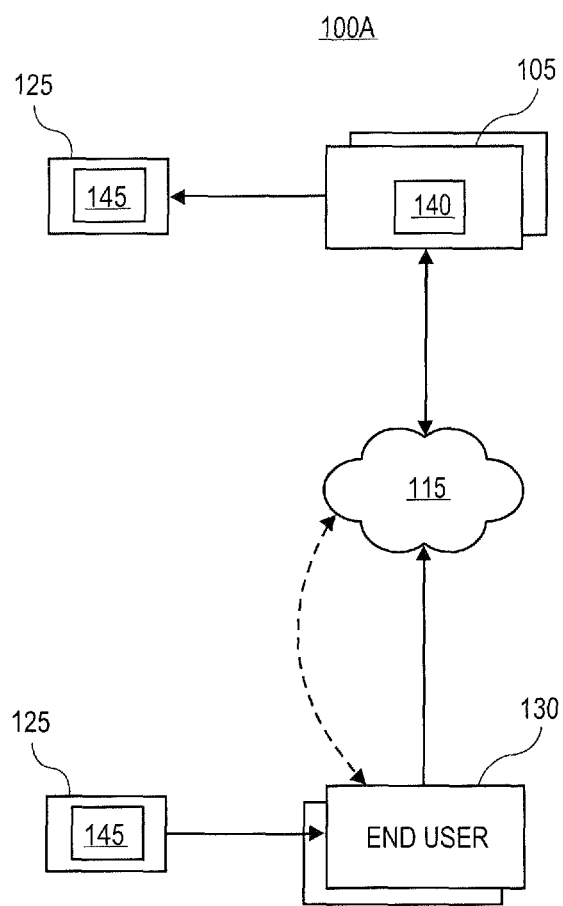
FIG. 1A shows another exemplary system in accordance with various embodiments.

FIG. 1A depicts system 100A that uses another embodiment for tracking playbacks of the content 125. It should be readily apparent to those of ordinary skill in the art that the system 100A depicted in FIG. 1A represents a generalized schematic illustration and that other components may be added or existing components may be removed or modified.

The content provider 105 can generate the content 125 with a callback module 145 that is configured to use a callback function to forward a global identifier of the content 125 along with player identifier, where the player identifier is generated based on a unique factor of the host device and stored in the callback module 145.

The content provider 105, the vendor 110, and the users 130 can couple with the Internet 115 via local network connection through respective computer devices as known to those skilled in the art. The local network connection can be a local area network (wired or wireless), a wide area network or combinations thereof implementing network protocols such as TCP/IP, ATM, SONET, or other known network protocols. The local network connection can also be part of a network that provides access to the Internet 115.

Figure 2:
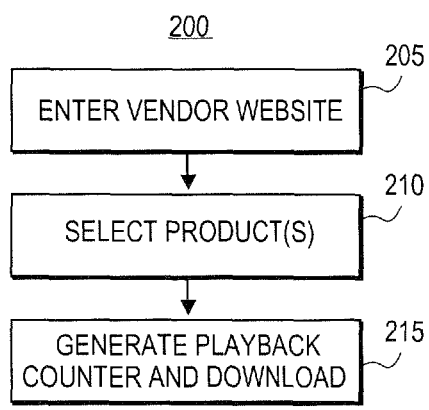
FIG. 2 illustrates an exemplary flow diagram in accordance with various embodiments.

FIG. 2 illustrates an exemplary flow diagram 200 in accordance with various embodiments. It should be readily apparent to those of ordinary skill in the art that the flow diagram 200 depicted in FIG. 2 represents a generalized schematic illustration and that other steps may be added or existing steps may be removed or modified.

As shown in FIG. 2, a content provider 105 can enter a web site of the vendor 110, in step 205. More particularly, the content provider 105 may desire to fund a content project. The content provider 105 can then browse to the web site of the vendor 110 to select products, services or advertisements (collectively known as "products" from herein) in order to fund and generate income on the content.

In step 210, the content provider 105 can select a subset of products to be placed in the content (e.g., 125). More specifically, the vendor 110 may provide a web page that display the list of products that are available to be placed in content. The content provider 105 can then select the desired products from the web page. An exemplary embodiment is shown in FIG. 3 of a product selection web page.

In other embodiments, a content provider 105 can visit a network service site such as RHAPSODY.COM that provides a selection of products for the content provider 105 to place in generated content or media. In yet other embodiments, the content providers 105 can utilize services that allow content providers to mix vendor products, embedded IDs, playback counter types, and callback services. It may be noted that in embodiments, a web site can be regarded as a type or form of a network service, or can operate in conjunction with a network service. In embodiments, callback services can be invoked at playtime or retrieval can be performed by other techniques. If the content and/or player is not loaded when network services are functioning, they can not send any counter data back, but a network service (such as ITUNES) can perform a syncing operation, as with iPod™ or other playback devices.

Figure 3:
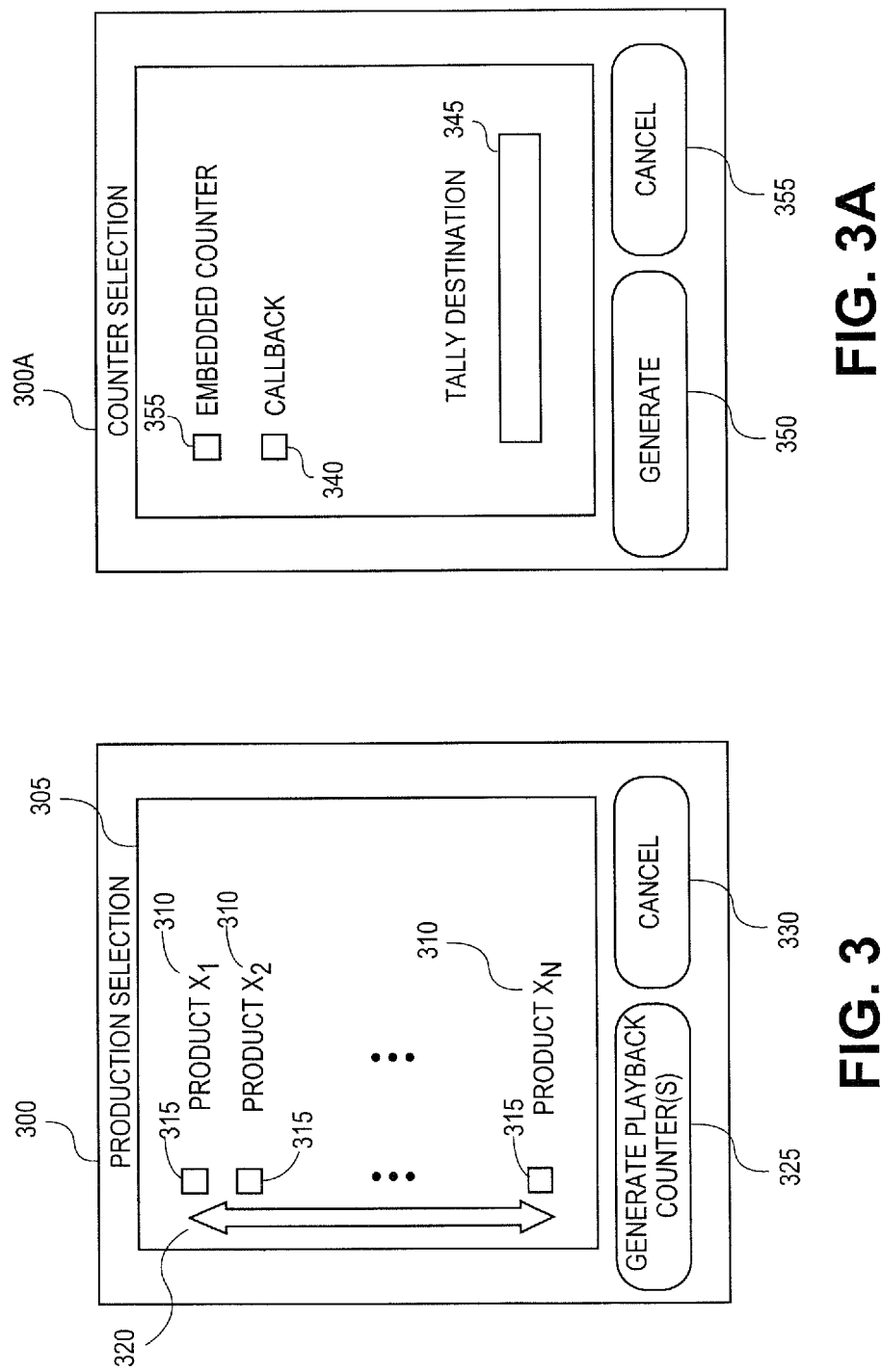
FIG. 3 depicts an exemplary user interface in accordance with various embodiments.

As shown in FIG. 3, the product selection user interface page 300 includes a product listing text box 305, which displays each product listing 310 that is available to be placed in content. In some embodiments, each product listing can also include a rate of payment for the content provider for each viewing of the content. Each product listing 310 can have a respective selection box 315 that when marked indicates a content provider would like to use this product in the generated content. The product listing text box 305 also includes a scroll bar 320 to permit content provider to shift the product listings in the vertical axis. The product selection interface page 300 also include a counter selection button 325, which provides another GUI for the selection of the counter 120 or callback module 145, which is shown in FIG. 3A. A cancel button 330 can also be included on the interface page 300 to permit a content provider to stop the transaction. In embodiments, the product selection user interface page 300 can also include additional terms, product provisions or special use terms, such as a content rating ("G" or "R" rating for general audience or containing some violence).

Product selection interface page 300 can be implement using a markup language such as SGML, HTML, XML and the like. The product selection interface page 300 can also be implemented with programming languages such as C, C++, Java, Python, Perl, Ruby, or others or with software programming development kits.

Accordingly, a content provider 105 can access the home page of the vendor 110 or a broker and navigate to the product selection interface page 300 to select products to place in content authored by the content provider 105. The content provider 105 can also return to the interface page 300 to select additional counters in the event the content provider 105 decides to produce multiple videos, each having a different product combination. In embodiments, the product selection can be an Internet services rather than simply a Web site.

FIG. 3A depicts an exemplary counter selection interface 300A in accordance with various embodiments. It should be readily apparent to those of ordinary skill in the art that the interface 300A depicted in FIG. 3A represents a generalized schematic illustration and that other components may be added or existing components may be removed or modified. Moreover, the counter selection interface 300A can be implement using a markup language such as SGML, HTML, XML and the like. The product selection interface page 300 can also be implemented with programming languages such as C, C++, Java, Python, Perl, Ruby, or others or with software programming development kits.

As shown in FIG. 3A, the interface 300A can include a selection box 335 for an embedded counter 120, a selection box 340 for the callback module 145, a tally destination field 345, a generate button 350 and a cancel button 355. A user can select the type of counter for the generated content 125 by selecting respective selection box 355 for the embedded playback counter 120 or selection box 340 for the callback module 340. The tally destination field 345 can indicate the location of the payment module 140. The content provider 105 can select himself, a vendor 110 or a third party. The format of the information in tally destination field 345 can be a universal resource locator or other similar referencing mechanism. The generate button 350 can generate the selected counter via a generator module in response to being activated. In embodiments, the generator module does not have to generator executable code per say, but can instead provide some additional data required in the header or other metadata space in the container file format (present in most video formats), which the players and/or callback functions utilize. The cancel button 355 can return the user to the product selection page 300 when activated.

Returning to FIG. 2, after the selection of products, the content provider 105 can select the counter and download it. More specifically, the content provider 105 can select an appropriate counter on interface 300A to generate the appropriate counter object. The website of the vendor 110 can assign a unique or global identifier to the selected counter and associate the selection of products with the selected counter. The website of the vendor 110 can then release the selected counter.

Accordingly, a content provider 105 can easily select products to be placed within the generated content and know the income or payments from the vendor 110 for each playback. The vendor 110 has achieved greater product visibility without paying a risky upfront fee. If the content becomes popular, both parties can benefit as viewership of the content increases.

Figure 4:
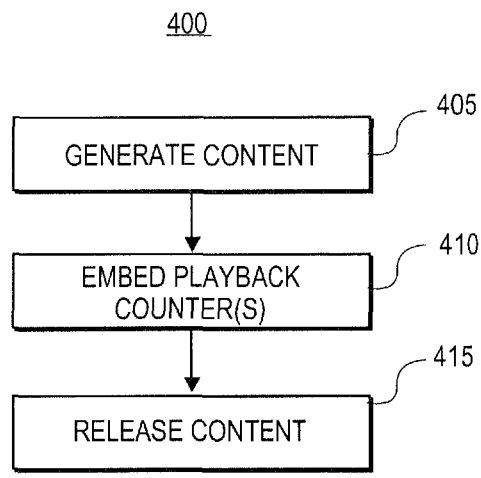
FIG. 4 shows another exemplary flow diagram in accordance with various embodiments.

FIG. 4 depicts an exemplary flow diagram 300 in accordance with various embodiments. It should be readily apparent to those of ordinary skill in the art that the flow diagram depicted in FIG. 4 represents a generalized schematic illustration and that other steps may be added or existing steps may be removed or modified.

As shown in FIG. 4, in step 400, the content provider 105 can generate the desired content with the selection of products placed within the content.

In step 410, the content provider 105 can associate the selected counter (playback counter 120 or callback module 140) within the file of the content. In step 415, the content provider 105 can then distribute the content with the selected counter. The content provider 105 can distribute on third-party media sharing websites or services, such as YOUTUBE.COM, LULUTV.COM, FLICKR.COM, BITTORRENT, or any other web sites or services that promote or support file sharing. The content provider 105 can release the content without any copy/distribution restrictions or under a license agreement such as a Creative Common license. In embodiments in a further regard, the content creator is not required to forfeit any other rights due to placement of content for distribution, and can retain rights including those to derivative works etc. In embodiments the distribution and coping of the original work can be encouraged instead of restricted, to reward the creator.

The content provider 105 in this case would prefer that the content be freely copied and distributed to as many users as possible using devices such as computers, wireless devices, personal digital assistants, portable digital music players or other similar devices.

Figure 5:
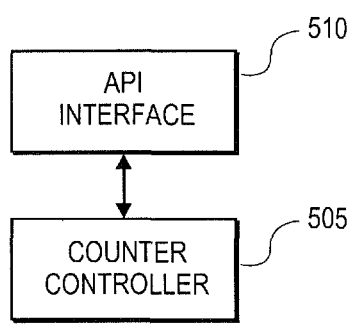
FIG. 5 illustrates an exemplary block diagram of a playback counter in in accordance with various embodiments.

FIG. 5 depicts an exemplary block diagram of the playback counter 120 in accordance with various embodiments. It should be readily apparent to those of ordinary skill in the art that the playback counter depicted in FIG. 5 represents a generalized schematic illustration and that other steps may be added or existing steps may be removed or modified.

As shown in FIG. 5, the playback counter 120 can comprise a counter controller 505 and an application program interface (labeled as "API" in FIG. 5) module 510. The playback counter 120 can be implemented using software components, hardware components or combinations thereof. In software embodiments, the playback counter 120 can be implemented using computer languages such as C, C++, object oriented programming languages or other programming languages. In hardware embodiments, the playback counter 120 can be implemented using a processor, microcontroller, an application specific integrated circuit, EEPROM or other programmable devices.

The counter controller 505 can provide the functionality of the playback counter 120 as previously described and described herein below. The counter controller 505 can increment a counter in response to the detection of playback of the content 125. The counter controller 505 can also be configured to transmit the current value of the counter 135 and global ID (which can be an identifier of the counter itself or of the content) to the vendor 110. In embodiments further data, such as an identifier of the host computer playing the content 125 and the global identifier of the playback counter 120, can also be transmitted to vendor 110.

The API module 510 can be configured to provide an interface to the host computer playing the content. The counter controller 505 can use the API module 505 to access the network port of the host computer to transmit the current counter value to the vendor 110 as well as detecting when a user as initiated a playback of the content 125.

Figure 6:
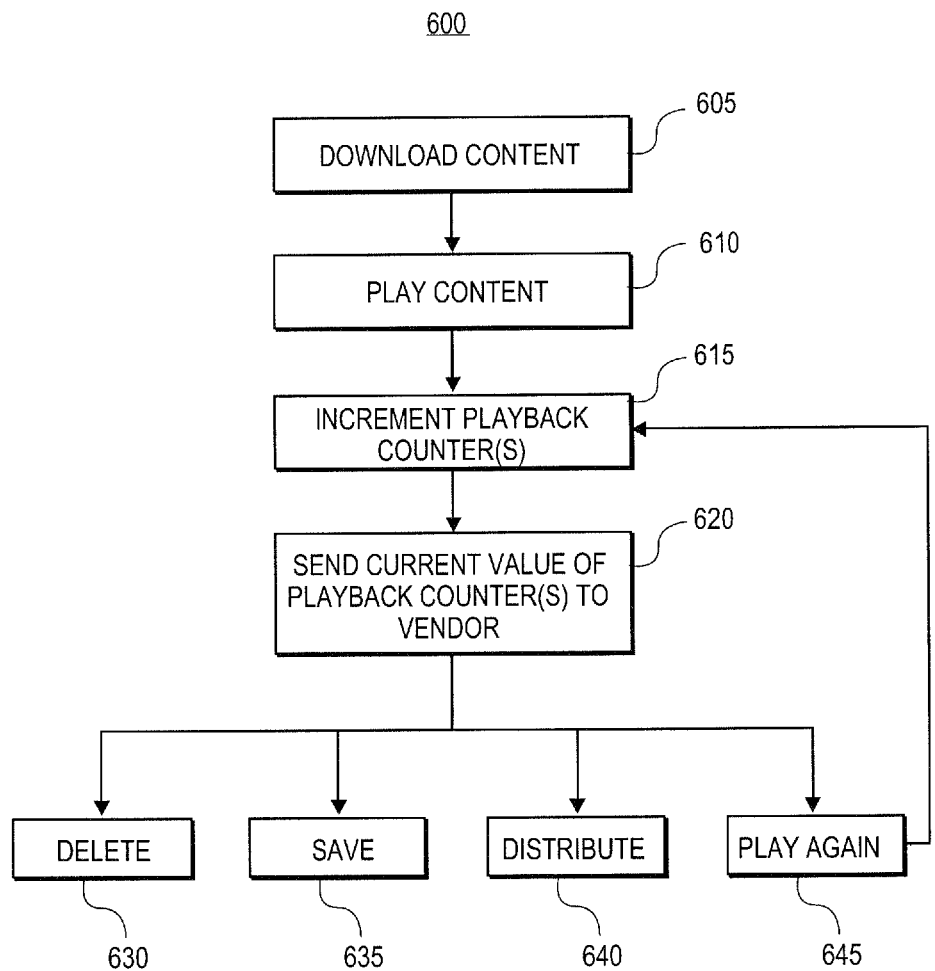
FIG. 6 depicts yet another exemplary flow diagram in accordance with various embodiments.

FIG. 6 illustrates an exemplary flow diagram 600 in accordance with various embodiments. It should be readily apparent to those of ordinary skill in the art that the flow diagram depicted in FIG. 6 represent a generalized schematic illustration and that other steps may be added or existing steps may be removed or modified.

As shown in FIG. 6, a user 130 can be configured to download the content 125 from a media sharing web site, in step 605. Alternatively, the content 125 can arrive directly from another computer user via electronic mail, chat session or other electronic mechanisms presently developed and in the future.

In step 610, the user 130 can initiate playback of the content 125 using a conventional media player such as RYTHMBOX, MIRO, QUICKTIME, WINDOWS MEDIA PLAYER, FLASH, or other software applications (whether open source or proprietary).

For the content 125 with the embedded playback counter 120, in step 615, the counter controller 505 can detect the initiation of the playback of the content 125 and increment the value of the counter, in step 615. The counter controller 505 can then transmit the current value of the counter 130 and global content ID to the vendor in step 620. In embodiments, other data such as the player ID can also be transmitted to the vendor. More particularly, the counter controller 505 can access the network port of the host computer playing the content 125 via API module 510 and transmit the current value of the counter 120.

Returning to step 615, for the content 125 with the callback module 140, the callback module 145 can initiate the callback to the specified destination. In step 620, the callback module 145 can then transmit the global ID and player ID to the specified destination.

After 620, the user 130 can be at a multiple decision point, at which point the user can if desired simply exit the playback application, or take one or more of the following actions. In step 630, the user 130 can delete the content 125. In step 635, the user 130 can save the content 125 for future playback. In step 640, the user 130 can distribute the content 125 by forwarding the content 125 to another computer user or posting on another web-site. In step 645, the user 130 can replay the content 125, which would then proceed to the processing of step 515. In embodiments, in step 645 terms of use can also be presented.

Figures 7, 7A, 7B:
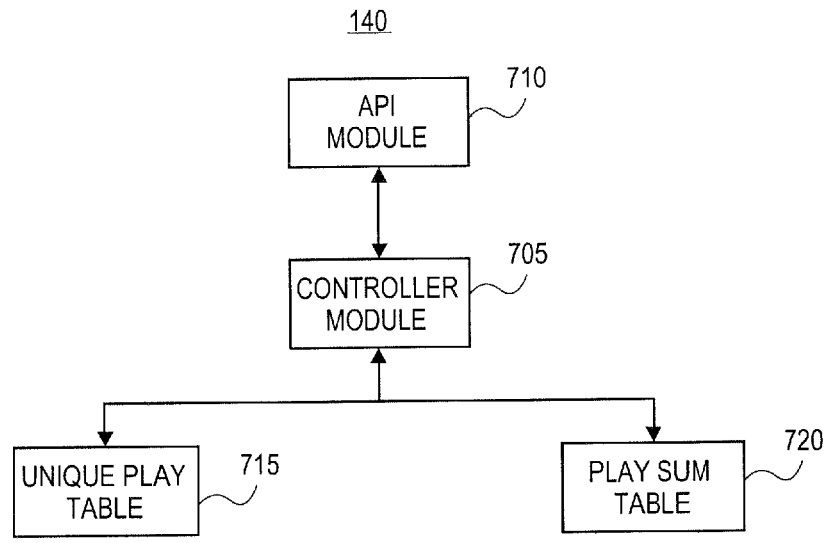
FIG. 7 shows an exemplary block diagram of a payment module in accordance with various embodiments.
FIG. 7A illustrates an exemplary data structure in accordance with various embodiments.
FIG. 7B shows another exemplary data structure in accordance with various embodiments.

FIG. 7 illustrates an exemplary block diagram of the payment module 140 in accordance with various embodiments. It should be readily apparent to those of ordinary skill in the art that the payment module 140 depicted in FIG. 7 represent a generalized schematic illustration and that other steps may be added or existing steps may be removed or modified.

As shown in FIG. 7, the payment module 140 can comprise a controller module 705, an application program interface ("API") module 710, a unique play table 715, and a play sum table 720. The payment module 140 can be implemented using software components, hardware components or combinations thereof. In software embodiments, the payment module 140 can be implemented using computer languages such as C, C++, object oriented programming languages or other programming languages. In hardware embodiments, the payment module 140 can be implemented using a processor, microcontroller, an application specific integrated circuit, EEPROM or other programmable devices.

The controller module 705 can be configured to implement the functionality of the payment module 140 in accordance with various embodiments. For example, the controller module 705 can detect data from the counters/callback modules through the API module 710. The controller module 705 can also be configured to determine how to differentiate the received between unique play data versus total playbacks data. The controller module 705 can be further configured to update the received data in the appropriate category.

The API module 710 can be configured to provide an interface between the controller module 705 and an underlying operating system, which would control the network ports of the host computer device. The API module 710 can receive the data from the counters/callback modules to pass on to the controller module 705.

The controller module 705 can be configured to couple with the unique play table 715, which is configured to store the total number of unique plays from the distributed content 125. The controller module can also be configured to couple with the play sum table 720, which is configured to store the total number of plays from each distributed content 125.

FIG. 7A depicts an exemplary schema for the unique play table 715. As shown in FIG. 7A, the unique play table 715 can comprise a global ID field 725 and a player ID field 730. Each record in the unique play table 715 can store the global ID and player ID from each item of distributed content 125 that is played. In embodiments, a host ID can also or instead be tracked to determine unique playback.

FIG. 7B illustrates an exemplary schema for the play sum table 720. As shown in FIG. 7B, the play sum table 720 can comprise a global ID field 735, a player ID field 740 and a sum field 745. The global ID field 735 stores the global ID and the player ID field 740 stores the player ID of a counter/callback module that has executed at least once. The sum field 745 stores the current value of the playbacks for the respective content 125. For the callback module distributed content, the controller module 705 can be configured to increment the existing value in the sum field 745 in response to a new playback.

The tables 715, 720 can be implemented as a database, a look-up table, a linked list or other referencing data structure. In some embodiments, the tables 715, 720 can be implemented as a single data structure.

Figure 8:
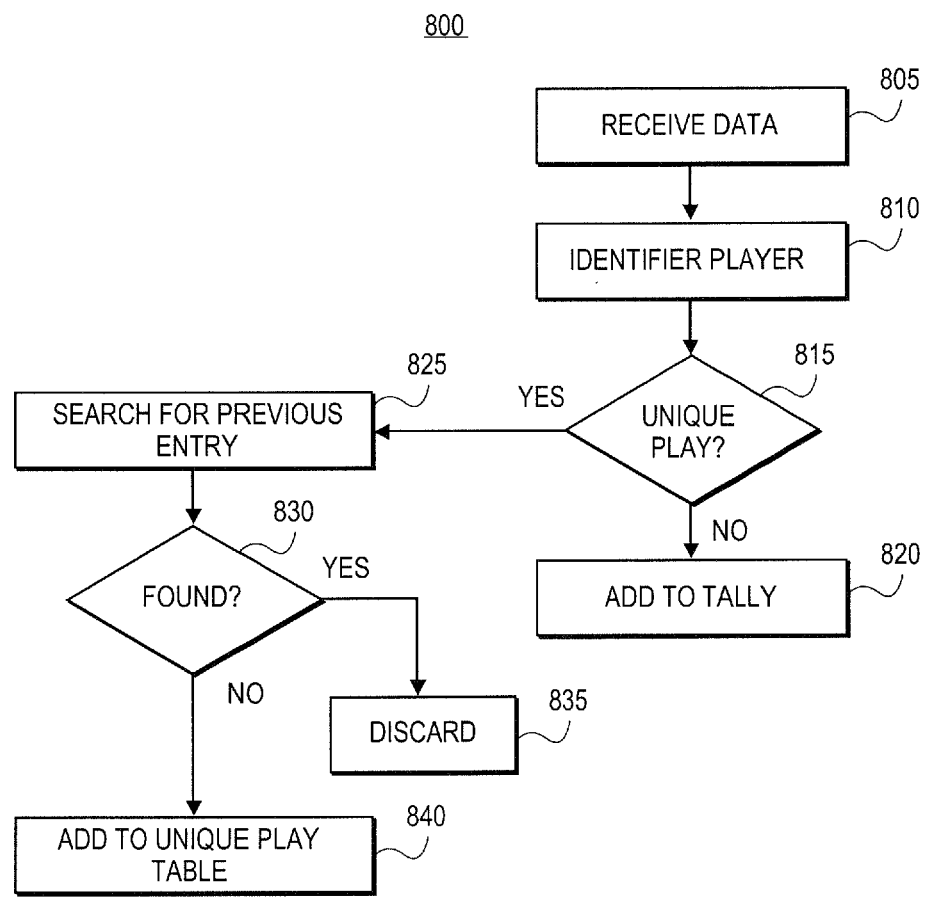
FIG. 8 depicts yet another exemplary flow diagram in accordance with various embodiments.

FIG. 8 illustrates an exemplary flow diagram 800 executed by the payment module 140 in accordance with various embodiments. It should be readily apparent to those of ordinary skill in the art that the flow diagram 800 depicted in FIG. 8 represent a generalized schematic illustration and that other steps may be added or existing steps may be removed or modified.

As shown in FIG. 8, the payment module 140 can be configured to receive data from the embedded playback counter 120 or the callback module 145, in step 805. More specifically, the playback counter 120 can transmit the global ID of the playback counter 120, along with the current value of the playback counter 120. In embodiments, playback counter 120 can also transmit a player identification, and/or an identification of the host computing platform. The callback module 145 can transmit the global ID of the callback module 145, and likewise in embodiments can also transmit a player identification or other data.

In step 810, the payment module 140 can identify the counter type from the playback counter 120 and the callback module 145. From the identified counter type, the payment module 140 can then determine that payment scheme for the received data, in step 815. If the payment scheme was based on number of plays, the payment module 140 can identify the table entry based on the global ID and the player identification and update the current value from the counter in the sum field 745 of the play sum table 720, in step 820. Alternatively, if the data is from a callback module 145, the payment module 140 can identify the respective entry of the data based on the global ID and player ID. The payment module 140 can then be configured to increment the current value of the sum field 745 associated with received data, in step 820.

Returning to step 815, if the payment scheme is for unique plays, the payment module can search the unique play table 715 for a previous entry, in step 825. If an entry is found in step 830, the data is discarded in step 835. Otherwise, the data is updated to the unique play table as a new entry, in step 840.

Subsequently, a vendor can pay a content provider for unique plays by searching the number of entries in the respective unique play table or for the total number of plays for a particular entry in the respective tally table. In embodiments, various payment or royalty arrangements can be provided, including for payment or brokerage services to periodically deposit payments or royalties into an escrow or other account, based on play totals and other information.

Figure 9:
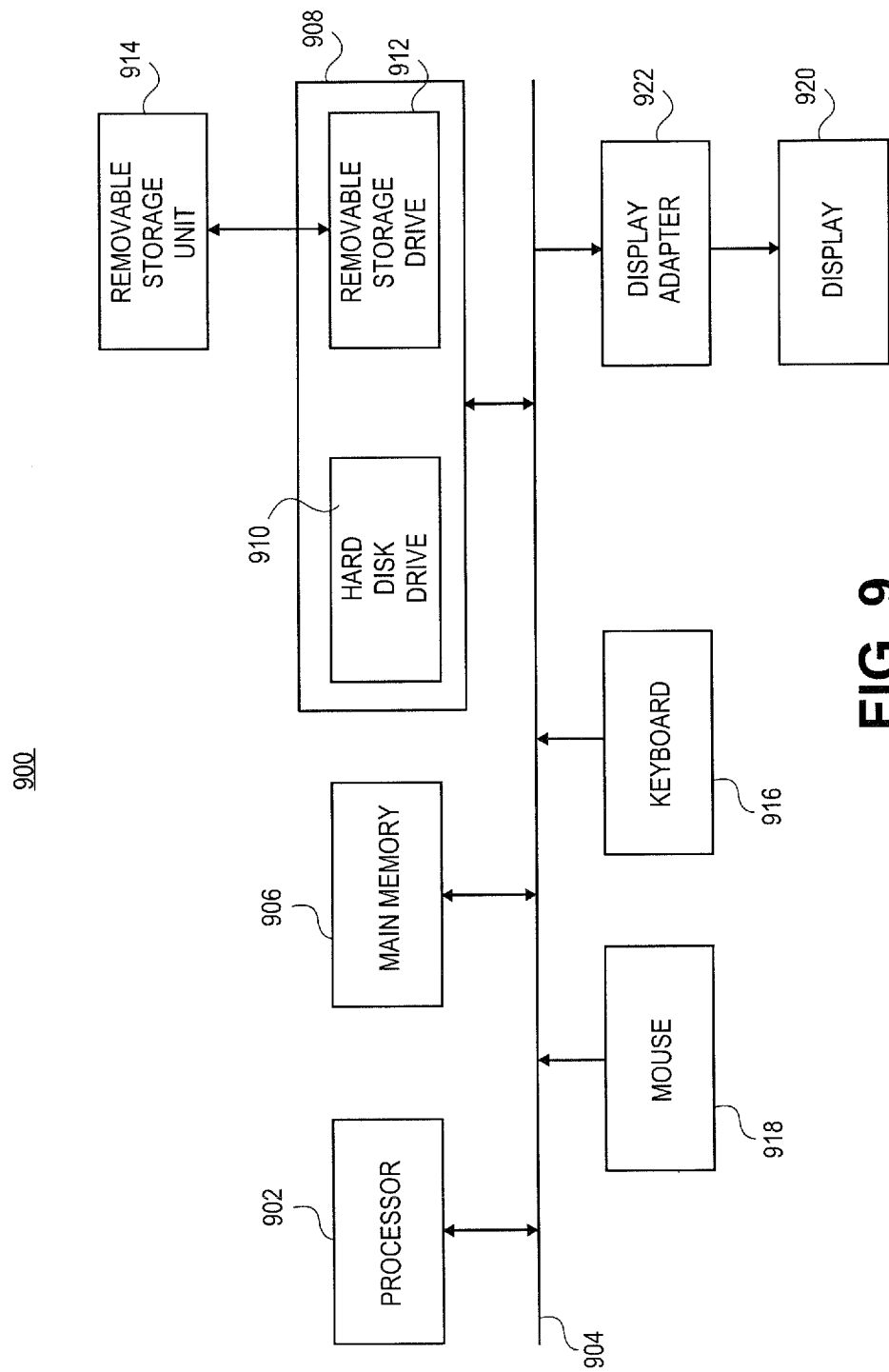
FIG. 9 illustrates an exemplary computing platform in accordance with various embodiment.

FIG. 9 depicts an exemplary block diagram of a computer device 900 where an embodiment may be practiced. The functions of the playback counter 120 may be implemented in program code and executed by the computer device 900. The playback counter 120 may be implemented in computer languages such as PASCAL, C, C++, JAVA, etc. In embodiments, computer device 900 can be or include a portable network-enabled media playback device, such as an audio or video playback device.

As shown in FIG. 9, the computer device 900 includes one or more processors, such as processor 902 that provide an execution platform for embodiments of the playback counter 120. Commands and data from the processor 902 are communicated over a communication bus 904. The computer device 900 also includes a main memory 906, such as a Random Access Memory (RAM), where the playback counter 120 may be executed during runtime, and a secondary memory 908. The secondary memory 908 includes, for example, a hard disk drive 910 and/or a removable storage drive 912, representing a floppy diskette drive, a magnetic tape drive, a compact disk drive, flash drive, etc., where a copy of a computer program embodiment for the playback counter 120 may be stored. The removable storage drive 912 reads from and/or writes to a removable storage unit 914 in a well-known manner. A user interfaces with the playback counter 120 with a keyboard 916, a mouse 918, and a display 920. The display adapter 922 interfaces with the communication bus 804 and the display 920. The display adapter 922 also receives display data from the processor 902 and converts the display data into display commands for the display 920.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of monitoring playback of content, the method comprising:
   selecting, by a content provider, a product to be advertised in a file of content from a product selection interface, wherein the product selection interface displays a product listing and terms comprising a content rating criteria for the file of content for each product that is available to be advertised;
   embedding, by a processor, a counter in the file of content, wherein the counter associates a time the product to be advertised is presented within the file of content and tracks a number of playbacks of the file of content that includes the time the product to be advertised is presented, wherein the counter to track the number of playbacks in view of the file of content satisfying the terms of the product;
   distributing the file of content with the counter; and
   receiving an indication of the number of playbacks tracked by the counter.

2. The method of claim 1, further comprising:
   requesting the counter from a vendor of the product to be advertised in the file of content.

3. The method of claim 1, wherein the counter comprises a playback counter or a callback module.

4. The method of claim 1, further comprising assigning a global identifier to at least one of the counter, the file of content, or the product.

5. The method of claim 1, wherein a payment to an author of the file of content is in view of the number of playbacks.

6. The method of claim 1, wherein the distributing the file of content comprises placing the file of content with the counter on a content distribution website or on a network service.

7. The method of claim 1, wherein the distributing the file of content comprises placing the file of content with the counter on a website available for download.

8. The method of claim 1, wherein the distributing the file of content comprises placing the file of content with the counter on network service available for download.

9. A method of monitoring playback of content for a payment, the method comprising:
   providing for a multiple products and advertisements;
   selecting, by a content provider, a subset of products, advertisements or combinations of products and advertisements to be advertised in a file of content from a product selection interface, wherein the product selection interface displays a product listing and terms comprising a content rating criteria for the file of content for each product that is available to be advertised;
   generating at least one playback counter associated with the subset, the at least one playback counter associating a time that the subset of products, advertisements or combinations of products and advertisements to be advertised are presented within the file of content; and
   providing the at least one playback counter available for download; and
   embedding, by a processor, the at least one playback counter in a file of content, wherein the at least one playback counter tracks a number of playbacks of the file of content that includes the time the product to be advertised is presented and wherein the at least one playback counter to track the number of playbacks in view of the file of content satisfying the terms of the product.

10. The method of claim 9, further comprising assigning a global identifier to at least one of the products, advertisements or combinations of products and advertisements, or the at least one playback counter.

11. The method of claim 9, further comprising determining a payment for a playback associated with the selection.

12. The method of claim 9, further comprising receiving values from a set of distributed playback counters.

13. The method of claim 12, further comprising determining a payment in view of the total value received from at least one of the set of distributed playback counters.

* * * * *